US012792282B2

(12) United States Patent
Shiohara

(10) Patent No.: US 12,792,282 B2

(45) Date of Patent: Nov. 10, 2026

(54) STORAGE MEDIUM, PROCESSING APPARATUS, AND CONTROL METHOD WITH AN IPP SUPPORTING APPLICATION THAT CAUSES DISPLAY FOR RECEIVING PRINT CANCELLATION BASED ON STATUS INFORMATION

(71) Applicant: CANON KABUSHIKI KAISHA, Tokyo (JP)

(72) Inventor: Tetsuya Shiohara, Nagano (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 234 days.

(21) Appl. No.: 18/799,793

(22) Filed: Aug. 9, 2024

(65) Prior Publication Data

US 2024/0402962 A1 Dec. 5, 2024

Related U.S. Application Data

(63) Continuation of application No. 18/163,728, filed on Feb. 2, 2023, now Pat. No. 12,086,486.

(30) Foreign Application Priority Data

Feb. 9, 2022 (JP) ................................ 2022-018963

(51) Int. Cl.
*G06F 3/12* (2006.01)

(52) U.S. Cl.
CPC .......... *G06F 3/1259* (2013.01); *G06F 3/1207* (2013.01); *G06F 3/1208* (2013.01);
(Continued)

(58) Field of Classification Search
CPC ...... G06F 3/1207; G06F 3/1208; G06F 3/121; G06F 3/1225; G06F 3/1228; G06F 3/125;
(Continued)

(56) References Cited

U.S. PATENT DOCUMENTS 6,473,192 B1 10/2002 Kidani et al.
11,301,190 B2 * 4/2022 Kakitsuba ............ G06F 3/1259
(Continued)

FOREIGN PATENT DOCUMENTS

CN 101145096 A 3/2008
CN 104793907 A 7/2015
(Continued)

OTHER PUBLICATIONS

First Office Action in Chinese Patent Application No. or Publication No. 202310080785.7 dated Apr. 17, 2026 in Global Dossier ( Year: 2026).*

*Primary Examiner* — Scott A Rogers
(74) *Attorney, Agent, or Firm* — Canon U.S.A., Inc. IP Division

(57) ABSTRACT

A non-transitory computer-readable storage medium storing an extension application configured to extend, by being associated with print data generation software, a function of the print data generation software for shared use by a plurality of printing apparatuses provided by different vendors stores a program for causing a computer to activate a status notification application configured to provide a notification of status information about a printing apparatus based on issuance of a print instruction to print print data on which the printing apparatus performs printing processing, and display a print preview screen for the print data in a case where the print data is acquired, wherein the status notification application provides the notification of the status information about the printing apparatus even in a case where an error does not occur in the printing apparatus.

11 Claims, 13 Drawing Sheets

(52) U.S. Cl.
CPC ............ *G06F 3/121* (2013.01); *G06F 3/1228* (2013.01); *G06F 3/1234* (2013.01); *G06F 3/1256* (2013.01); *G06F 3/1274* (2013.01); *G06F 3/1284* (2013.01); *G06F 3/1287* (2013.01)

(58) Field of Classification Search
CPC .... G06F 3/1229; G06F 3/1234; G03F 3/1253; G03F 3/1254; G03F 3/1256; G03F 3/1259; G03F 3/1274; G03F 3/1276; G03F 3/1284; G03F 3/1285; G03F 3/1287; G03F 3/1288; H04N 1/00244; H04N 1/0044; H04N 1/00477
See application file for complete search history.

(56) References Cited

U.S. PATENT DOCUMENTS

| | | | | |
|---|---|---|---|---|
| 12,099,759 | B2 * | 9/2024 | Yokoyama ............ | G06F 3/1285 |
| 2020/0310720 | A1 * | 10/2020 | Kakitsuba ............. | G06F 3/1256 |
| 2025/0390255 | A1 * | 12/2025 | Narita ................... | G06F 3/1207 |

FOREIGN PATENT DOCUMENTS

| | | | |
|---|---|---|---|
| CN | 107728960 | A | 2/2018 |
| CN | 109669645 | A | 4/2019 |
| CN | 110659003 | A | 1/2020 |
| JP | 2020087062 | A | 6/2020 |
| JP | 2020160989 | A | 10/2020 |

* cited by examiner

STORAGE MEDIUM, PROCESSING APPARATUS, AND CONTROL METHOD WITH AN IPP SUPPORTING APPLICATION THAT CAUSES DISPLAY FOR RECEIVING PRINT CANCELLATION BASED ON STATUS INFORMATION

CROSS-REFERENCE TO RELATED APPLICATIONS

This application is a Continuation of U.S. patent application Ser. No. 18/163,728, filed Feb. 2, 2023, which claims the benefit of Japanese Patent Application No. 2022-018963, filed Feb. 9, 2022, both of which are hereby incorporated by reference herein in their entirety.

BACKGROUND

Field of the Disclosure

The present disclosure relates to a storage medium, an information processing apparatus, and a control method.

Description of the Related Art

There are applications that extend a function of a printer driver (hereinafter, the applications will be referred to as "extension application"). For example, Japanese Patent Application Laid-Open No. 2019-74906 discusses a technique for extending a function such as a stamp function using an extension application.

Further improvements in convenience of functions of the extension applications are demanded.

SUMMARY

According to embodiments of the present disclosure, a non-transitory computer-readable storage medium storing an extension application configured to extend, by being associated with print data generation software, a function of the print data generation software for shared use by a plurality of printing apparatuses provided by different vendors stores a program for causing a computer to activate a status notification application configured to provide a notification of status information about a printing apparatus based on issuance of a print instruction to print print data on which the printing apparatus performs printing processing, and display a print preview screen for the print data in a case where the print data is acquired, wherein the status notification application provides the notification of the status information about the printing apparatus even in a case where an error does not occur in the printing apparatus.

Further, features of the present disclosure will become apparent from the following description of exemplary embodiments with reference to the attached drawings.

DESCRIPTION OF THE EMBODIMENTS

Figure 1:
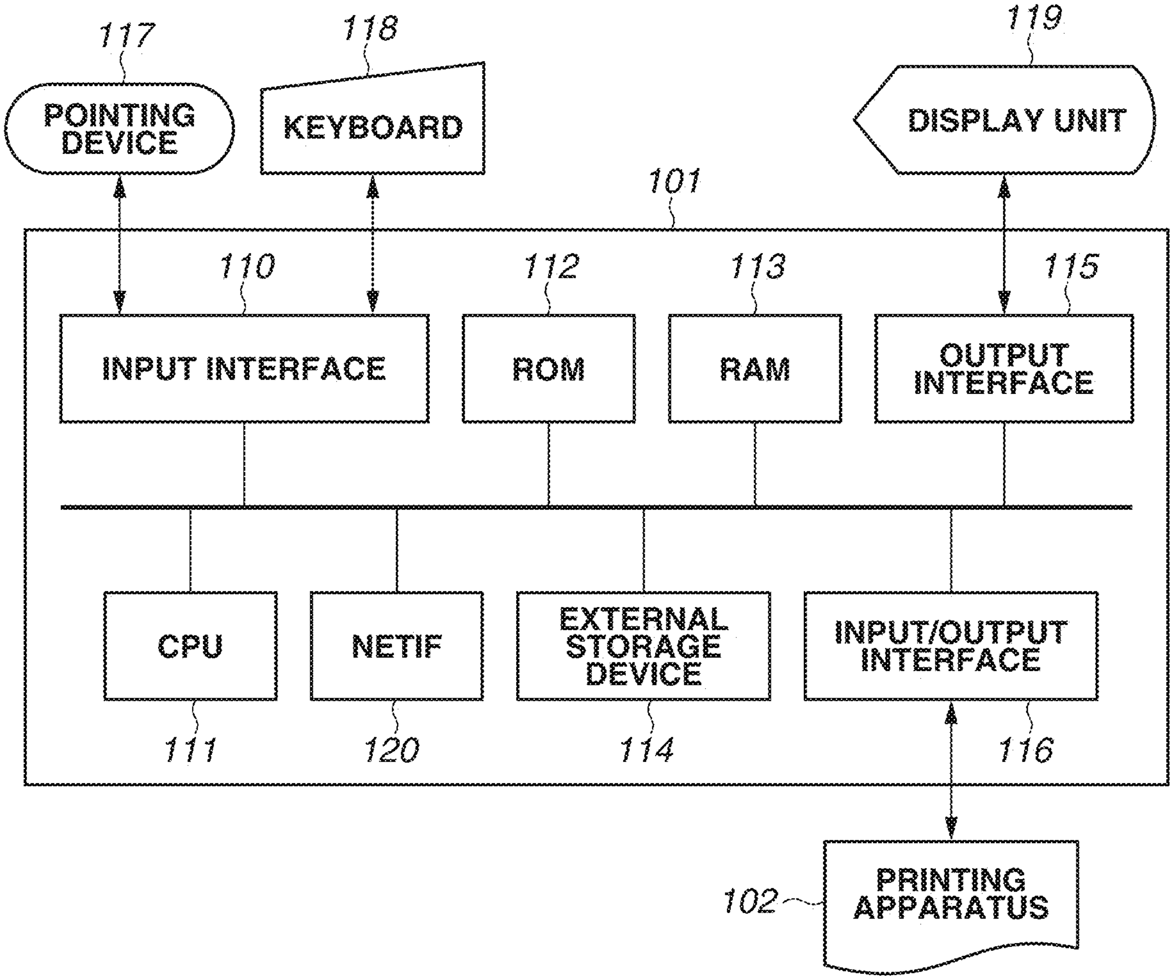
FIG. 1 is a diagram illustrating a hardware configuration of a system.

Various exemplary embodiments of the present disclosure will be described below with reference to the drawings. It should be understood that the scope of the present disclosure also encompasses changes and modifications made to the below-described exemplary embodiments as needed based on ordinary skills in the art without departing from the spirit of the disclosure.

An information processing apparatus and a printing apparatus that are included in a printing system according to a first exemplary embodiment will be described below. A host computer 101 is an example of an information processing apparatus and includes an input interface 110, a central processing unit (CPU) 111, a read-only memory (ROM) 112, a random access memory (RAM) 113, an external storage device 114, an output interface 115, and an input/output interface 116. Further, input devices such as a keyboard 118 and a pointing device 117 are connected to the input interface 110, and a display device such as a display unit 119 is connected to the output interface 115. A network interface (NETIF) 120 is a network interface that performs control for performing data transfer to and from external devices via a network.

The ROM 112 stores an initialization program. The external storage device 114 stores application programs, an operating system (OS), print data generation software, and various other types of data. An extension application 204 described below is stored in the external storage device 114. The RAM 113 is used as a work memory in executing various programs stored in the external storage device 114, and various programs are operable in the host computer 101.

According to the present exemplary embodiment, the CPU 111 performs below-described functions of the host computer 101 and below-described processes of flowcharts by performing processing based on procedures of programs stored in the ROM 112.

A printing apparatus 102 is connected to the host computer 101 via the input/output interface 116. While the host computer 101 and the printing apparatus 102 are separated here, the host computer 101 and the printing apparatus 102 can be combined together as a single information processing apparatus.

While the host computer 101 is described as an example of an information processing apparatus according to the present exemplary embodiment, the present exemplary embodiment is not limited to the example. For example, various apparatuses such as a mobile terminal, a personal computer (PC), a tablet terminal, a personal digital assistant (PDA), and a digital camera are applicable as an information processing apparatus. Further, while a printer is described as an example of the printing apparatus 102 according to the present exemplary embodiment, the present exemplary embodiment is also applicable to, for example, an inkjet printer, a full-color laser beam printer, and a monochrome printer.

There is a known configuration that issues a print instruction to the printing apparatus 102 connected to the host computer 101 using a printer driver installed as software for controlling the printing apparatus 102 in the host computer 101. The OS that is basic software is installed in the host computer 101, and the printer driver is configured based on specifications defined by the OS and operates when called by the OS. A vendor that provides the printing apparatus 102 can provide a means for instructing the printing apparatus 102 to print using the OS, by providing a printer driver that conforms to the specifications of the OS. In recent years, Windows® provides a standard class driver (hereinafter, also referred to as "standard driver") that can be used commonly among printing apparatuses provided by a plurality of vendors. Such a standard driver is included in a package of the OS and becomes ready to use easily by connecting a printing apparatus to the host computer 101. Thus, it is unnecessary to separately install a model-specific printer driver suitable for the printing apparatus 102, which is highly convenient to users. Further, the standard driver is configured so that a print function appropriate for print capabilities generated based on information acquired from the connected printing apparatus 102 can be designated. Thus, a user using the standard driver can designate a print function appropriate for capabilities of the connected printing apparatus 102 while using the single standard driver. According to the present exemplary embodiment, the standard driver is described as print data generation software 202.

The extension application 204 will be described below. An application (the extension application 204) for extending a function can be associated with the standard driver. The extension application 204 can be provided by the vendor that provides the printing apparatus 102. By providing the extension application 204, the vendor can provide a function (extension function) that cannot be realized by the standard driver alone.

The extension application 204 is software for extending a function of the print data generation software 202 and is software that is not pre-included in the OS (software that is not included in the package of the OS). Thus, a user needs to download and install the extension application 204 from a server via the Internet by operating the host computer 101. Alternatively, the extension application 204 can be installed automatically when the printing apparatus 102 is connected to the host computer 101. Specifically, in a case where the printing apparatus 102 is connected to the host computer 101, the OS acquires device identification information from the printing apparatus 102.

The OS can download the extension application 204 corresponding to the acquired device identification information from the server via the Internet and can install the extension application 204. Specifically, the print data generation software 202 and the extension application 204 are stored as separate files in the host computer 101. The print data generation software 202 and the extension application 204 may be updated to upgrade to a new version, and this update processing is performed at different timings. Specifically, the host computer 101 acquires the print data generation software 202 and the extension application 204 at different timings. Further, a trigger to acquire the print data generation software 202 by the host computer 101 and a trigger to acquire the extension application 204 by the host computer 101 are also different. In a case where the extension application 204 is installed, the OS associates the extension application 204 with the print data generation software 202 and the printing apparatus 102.

The extension application 204 according to the present exemplary embodiment includes a print setting screen extension unit 205, a skip control unit 206, a print function extension unit 207, a print data editing unit 208, and a notification unit 209. Further, the extension application 204 includes shared information 210. The shared information 210 is commonly accessible from each unit. The shared information 210 is a file stored in the external storage device 114 or information stored on the RAM 113. The extension application 204 writes and reads information to and from the shared information 210 using an application program interface (API) provided by the OS.

Figure 2A:
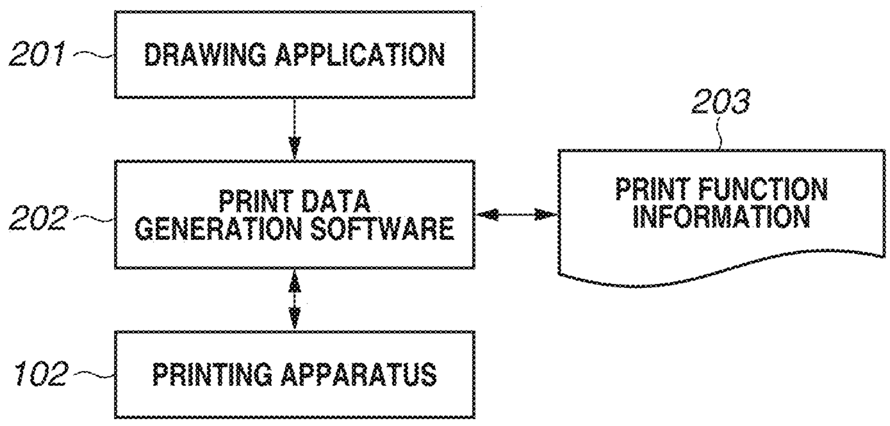
FIGS. 2A, 2B, and 2C are diagrams illustrating a configuration of software of an information processing apparatus and a printing apparatus.
Figure 2B:
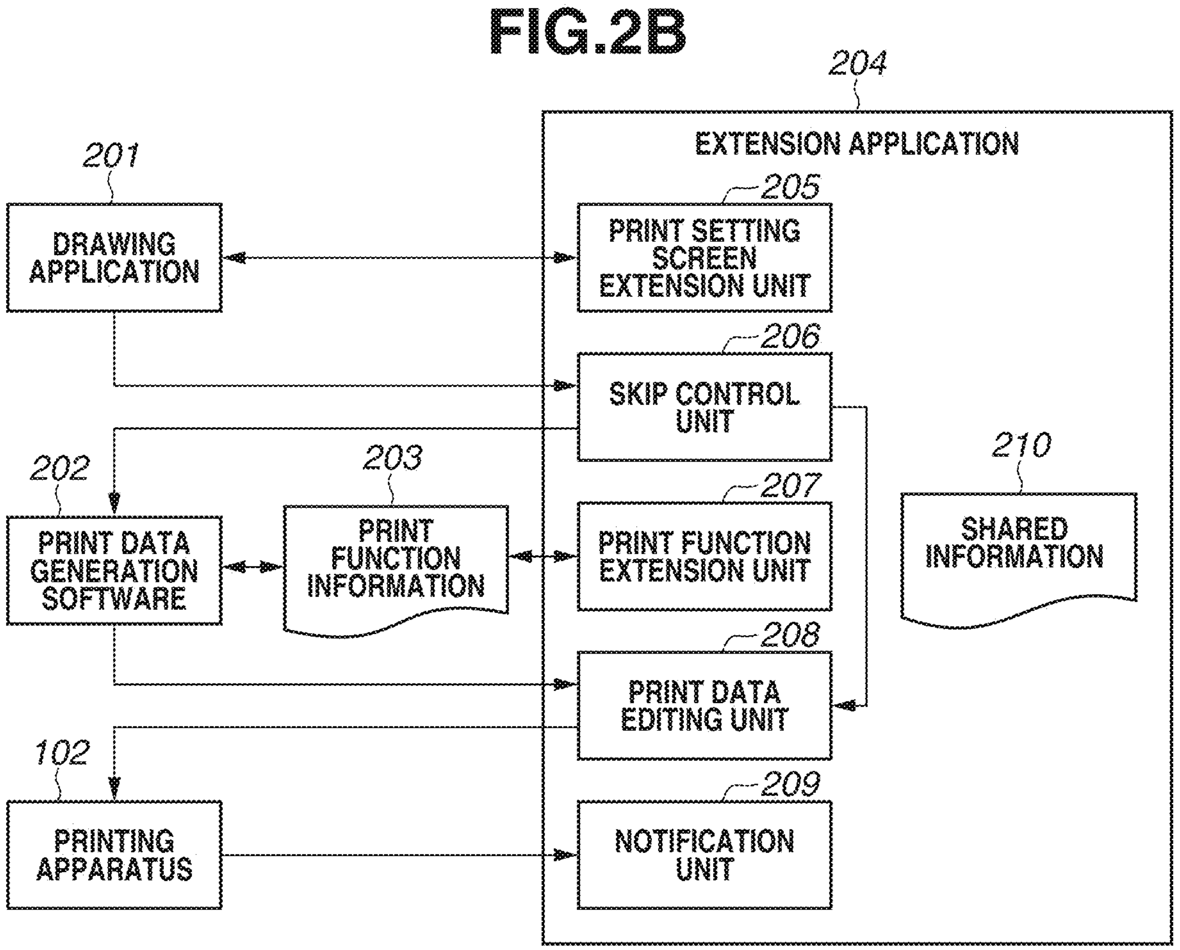
Figure 2C:
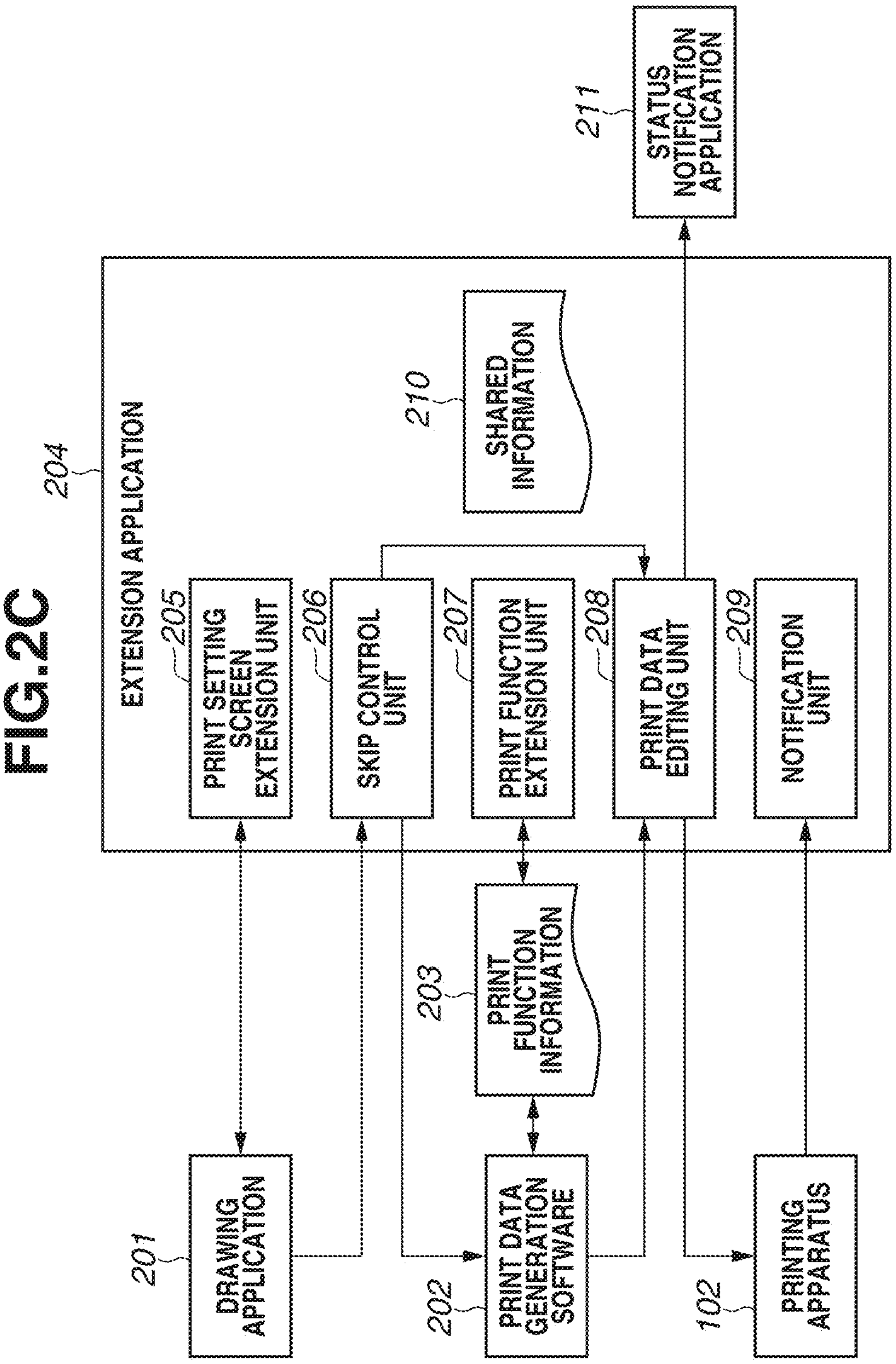

FIGS. 2A to 2C are diagrams schematically illustrating a configuration of a printing system including software of the host computer 101 and the printing apparatus 102. A printing system using the host computer 101 in which a Microsoft® Windows® 11 is installed as the OS will be described below. FIG. 2A is a diagram illustrating a general configuration in a case where the extension application 204 is not associated with the print data generation software 202 and the printing apparatus 102.

A drawing application 201 is software that generates drawing data (image data) to be printed. For example, a document creation application and a spreadsheet application correspond to the drawing application 201. In a case where a print request is received from a user, the drawing application 201 issues a print instruction to the OS. The print instruction includes print setting information for specifying operations of the print data generation software 202 and the printing apparatus 102. The print setting information is also referred to as print ticket (hereinafter, "PT").

The drawing application 201 can display a print setting screen provided by one of the print data generation software 202, the OS, and the drawing application 201 in order to output the print setting information. The print setting screen displays setting items and control items based on capabilities information (operability information about the printing apparatus 102) acquired from the print data generation software 202. The setting items indicate settable print functions, and the control items indicate setting values of the setting items. The capabilities information is also referred to as print capabilities (hereinafter, "PC"). The print data generation software 202 determines the PC based on print function information 203. The print function information 203 is data indicating print functions and describes all settable print functions, setting values of the print functions, and an exclusive relationship between the setting values. The print function information 203 is also referred to as print device capabilities (PDC). The print function information 203 is included in a configuration file of the print data generation software 202 and is arranged as an unchangeable file in the external storage device 114. Alternatively, the print function information 203 can be generated dynamically by the print data generation software 202. Specifically, the print data generation software 202 or the OS can be configured to acquire attribute data about the printing apparatus 102 from the printing apparatus 102 and to generate the print function information 203 based on attribute information in the acquired attribute data. In a case where the print function information 203 is generated dynamically, the generated print function information 203 is editable. The attribute data about the printing apparatus 102 that is acquired from the printing apparatus 102 refers to a response acquired by issuing an Internet Print Protocol (IPP) Get-Printer-Attributes operation to the printing apparatus 102. The response includes attribute information indicating functions (capabilities of the printing apparatus 102) operable by the printing apparatus 102 and setting values relating to the attribute information. The response is stored in the RAM 113.

As described above, the print data generation software 202 is configured so that a user can designate, for each connected printing apparatus 102, a print function that can be used using the printing apparatus 102. In other words, the print data generation software 202 is configured so that a user can designate a print function that can be used for each connected printing apparatus even in a case where printing apparatuses having different functions or printing apparatuses developed by different vendors are connected. A configuration that uses an IPP class driver installed in Windows® 11 as the print data generation software 202 is described herein. The IPP class driver is a printer driver that performs printing processing based on specifications of a standard print protocol referred to as IPP and is included in the package of the OS. The IPP class driver is not a printer driver specific to the model of the printing apparatus 102 but a standard class driver that can be used commonly by a plurality of printing apparatuses. Further, the IPP class driver acquires capabilities information about the connected printing apparatus 102 and generates the print function information 203 based on the information so that a user can designate a print function that is supported by the connected printing apparatus 102.

A process of transmitting print data to the printing apparatus 102 and printing the print data in FIG. 2A will be described below. The OS generates intermediate data (also referred to as input data) based on a print instruction output from the drawing application 201 and transmits the intermediate data to the print data generation software 202.

Data that the drawing application 201 outputs for printing is data in Graphics Device Interface (GDI) format (GDI-format data) or data in Extensible Markup Language Paper Specification (XPS) format (XPS-format data). In a case where an IPP class driver is used as the print data generation software 202 and data output from the drawing application 201 is GDI-format data, the OS converts the GDI-format data output from the drawing application 201 into XPS-format data. Then, the OS transmits the converted XPS-format data as intermediate data to the print data generation software 202. In a case where data output from the drawing application 201 is XPS-format data, the OS transmits the XPS-format data as intermediate data to the print data generation software 202. The intermediate data includes image data that is information about a picture to be formed on a sheet and print setting information set by a user.

The print data generation software 202 converts the acquired intermediate data into print data interpretable by the printing apparatus 102 and transmits the converted print data to the printing apparatus 102. The print data includes drawing data that is information about a picture to be formed on a sheet and print setting attribute information (attribute information designating print settings) generated based on the print setting information set by a user. The print setting attribute information includes attribute information indicating functions (capabilities of the printing apparatus) that can be operated by the printing apparatus 102 and setting values relating to the attribute information.

The printing apparatus 102 performs printing on a sheet based on the print data transmitted from the print data generation software 202. At this time, the printing apparatus 102 forms the drawing data included in the print data on a sheet by performing operations based on the print setting attribute information included in the print data. The print setting attribute information includes print quality information (image quality priority, speed priority), drawing data size information, and drawing position (margin) information.

FIG. 2B is a diagram illustrating a configuration where the extension application 204 is associated with the print data generation software 202 and the printing apparatus 102. Unless otherwise specified, configurations and processes are similar to those in FIG. 2A.

In a case where a print request is received from a user, the drawing application 201 issues a print instruction to the OS. In this configuration, as in the configuration illustrated in FIG. 2A, the drawing application 201 can display a print setting screen. In the configuration, a print setting screen provided by the extension application 204 is displayed. Specifically, a print setting screen provided by the print setting screen extension unit 205 of the extension application 204 is displayed. Whether the print setting screen provided by the print setting screen extension unit 205 is displayed depends on a user operation.

Further, in a case where the drawing application 201 receives a print request from a user and issues a print instruction to the OS, the OS activates the skip control unit 206. The skip control unit 206 performs control to skip or not skip a process of the print data generation software 202. After the skip control processing by the skip control unit 206, the OS generates intermediate data based on the print instruction output from the drawing application 201 and transmits the intermediate data to the print data generation software 202. In a case where the skip control unit 206 does not perform the skip control, the print data generation software 202 processes the intermediate data into print data interpretable by the printing apparatus 102 and transmits the print data to the print data editing unit 208. On the other hand, in a case where the process of the print data generation software 202 is skipped, the intermediate data is not processed by the print data generation software 202 and is transmitted to the print data editing unit 208. Thus, the print data editing unit 208 processes the intermediate data.

The print data editing unit 208 edits the intermediate data transmitted from the print data generation software 202 or the print data processed by the print data generation software 202. For example, in N-up printing, the editing is performed as described below. Specifically, the print data editing unit 208 changes a layout of the intermediate data or the print data based on the print setting information about the N-up printing that is received from the OS. Further, the print data editing unit 208 can display a user interface (UI) screen on the display unit 119 and can display an image of a printing result of the intermediate data or the print data as a preview screen. In a state where the screen remains open, the print data editing unit 208 does not transmit the print data to the printing apparatus 102, and in a case where the screen is closed, the print data transmission processing is operated.

After the print data editing unit 208 edits the intermediate data or the print data, the edited print data is transmitted to the printing apparatus 102. The printing apparatus 102 performs printing on a sheet based on the received print data.

In a case where the skip control unit 206 skips the process of the print data generation software 202, the print data editing unit 208 can convert the received intermediate data into print data interpretable by the printing apparatus 102. Further, a function provided by the OS can be used to convert intermediate data into print data.

The extension application 204 includes the print function extension unit 207. The print function extension unit 207 can edit the print function information 203 (PDC) generated by the print data generation software 202 or the OS. Thus, the print function extension unit 207 can add a function provided by the extension application 204, a function that is supported by the printing apparatus 102 but is not supported by the print data generation software 202, and an exclusive relationship between setting values of the print function. The OS activates the print function extension unit 207 in a case where the extension application 204 is associated with the printing apparatus 102 and the print data generation software 202 for the first time. Furthermore, the OS can activate the print function extension unit 207 at another timing, e.g., at a timing at which the OS is activated. With the foregoing configuration, in a case where an optional device (e.g., finisher) is added afterward to the printing apparatus 102 and a printing-related function is extended, the print function extension unit 207 detects the extended function and adds the extended function to the print function information 203.

Further, the extension application 204 includes the notification unit 209. The notification unit 209 can display a notification (status notification) to a user in a case where an error occurs in the printing apparatus 102. For example, in a case where an out-of-sheet error occurs in the printing apparatus 102, the print data generation software 202 detects the out-of-sheet error, and the OS displays a message on the display unit 119 using a notification function of the OS that is referred to as "toast notification". In a case where a user presses the toast notification, the notification unit 209 of the extension application 204 is called by the OS, and a UI screen of the notification unit 209 is displayed. The UI screen of the notification unit 209 can display, for example, a message indicating details of the out-of-sheet error and a sheet replenishment method.

The extension application 204 for realizing the present exemplary embodiment is not limited to a configuration that includes all of the above-described functions (units) and can have a configuration that includes only part of the functions or a configuration that includes another function. Further, the extension application 204 is sometimes referred to simply as printing software. As described above, the extension application 204 includes at least one of the function of displaying a setting screen (the print setting screen extension unit 205), the function of controlling whether to skip the process of the print data generation software 202 (the skip control unit 206), the function of editing print data to be input to the printing apparatus 102 (the print data editing unit 208), the function of extending a function that can be designated using the print data generation software 202 (the print function extension unit 207), and the function of displaying a screen in a case where an error occurs in the printing apparatus 102 (the notification unit 209).

Further, the extension application 204 can end an operation each time a process of each unit ends. In this case, the OS activates the extension application 204 each time a request to use a unit is received. Further, there are other possible configurations. For example, while the OS ends an operation of the extension application 204 in a case where a process of the print setting screen extension unit 205 ends, the OS can maintain the extension application 204 in an activated state even in a case where the process of the skip control unit 206 ends.

Furthermore, the extension application 204 can cancel a process of a unit during the process. In a case where a process is cancelled, a job on a print queue that is being processed is deleted by the OS. The print job includes print data.

Meanwhile, as described above, the notification unit 209 can display the status notification to a user. On the contrary, a notification unit 209 according to conventional techniques can display the status notification only in a case where an error occurs in the printing apparatus 102. In other words, the notification unit 209 according to conventional techniques has an issue that the status notification cannot be displayed in a case where the printing apparatus 102 is not in an error state. There are, however, demands for displaying the status notification also in a case where the printing apparatus 102 is not in an error state. Furthermore, a toast notification displayed by the notification unit 209 according to conventional techniques only displays information indicating that the printing apparatus 102 is in an error state, and no detailed information about the error such as a type of the error is displayed. Thus, according to the present exemplary embodiment, control is performed so that the status notification can be displayed even in a case where the printing apparatus 102 is not in an error state. Further, information displayed at an error occurrence is the status information about the printing apparatus 102 including detailed information about the error, whereas information displayed at a point other than an error occurrence is the status information about the printing apparatus 102. Detailed information about an error in a case where, for example, the error relates to a low level of ink, information about a color that is low in ink level or information indicating ink levels of inks other than an ink determined as being low in ink level.

Further, as described above, the notification unit 209 according to conventional techniques first provides a toast notification in a case where an error occurs in the printing apparatus 102. The toast notification is hidden on a screen after a predetermined period passes. Thus, there may be cases where, if a user fails to notice the toast notification and the toast notification is not pressed, the status notification is not displayed on the UI screen of the notification unit 209. Thus, according to the present exemplary embodiment, control is performed so that the status notification can be displayed at a timing that is easy for a user to notice the status notification.

Furthermore, the print data editing unit 208 can display a print data preview on the UI screen without a toast notification only between the timing of acquisition of intermediate data or print data to the timing of transmission of the acquired intermediate data or the acquired print data to the printing apparatus 102. The status information about the printing apparatus 102 after the transmission of the intermediate data or the print data to the printing apparatus 102, however, cannot be displayed. Thus, according to the present exemplary embodiment, control is performed so that the status information about the printing apparatus 102 after the print data is transmitted to the printing apparatus 102 and printing is started is also displayed without a toast notification.

Thus, according to the present exemplary embodiment, in a case where the extension application 204 receives intermediate data or print data, the extension application 204 activates an application (status notification application 211) having a status notification function of displaying a status notification even in a case where the printing apparatus 102 is not in an error state. Furthermore, the activation of the status notification application 211 is performed at a timing at which a print instruction is issued by a user. Details thereof will be described below. FIG. 2C is a diagram illustrating a system configuration in a case where the extension application 204 activates the status notification application 211. In a case where the print data editing unit 208 of the extension application 204 receives intermediate data or print data transmitted from the print data generation software 202 based on a print instruction from a user, the print data editing unit 208 activates the status notification application 211 having the status notification function. Then, a notification screen relating to the status information about the printing apparatus 102 is displayed. This makes it possible to display a status notification even in a case where the printing apparatus 102 is not in an error state. Further, the possibility of not displaying a status notification in a case where a user fails to notice a toast notification and the toast notification is not pressed is reduced. Furthermore, the status information about the printing apparatus 102 after the print data is transmitted to the printing apparatus 102 and printing is started can also be displayed without a toast notification.

Figure 3:
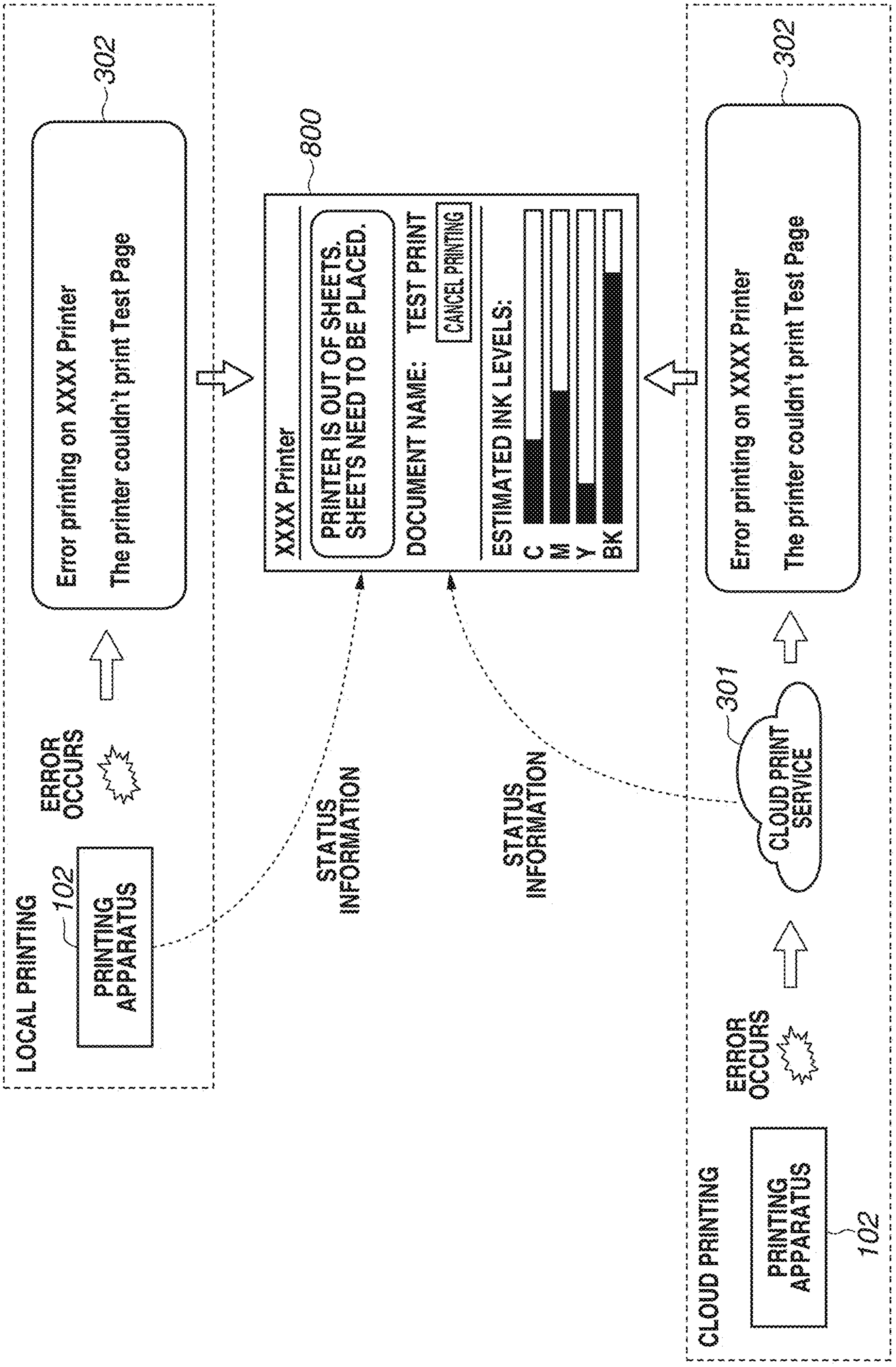
FIG. 3 is a flowchart illustrating a configuration of local printing and cloud printing.

FIG. 3 is a flowchart illustrating a configuration of local printing and cloud printing. A case where the extension application 204 operates in association with the print data generation software 202 for local printing according to the present exemplary embodiment will be described. A case where the extension application 204 operates in association with the print data generation software 202 for cloud printing will be described below as a second exemplary embodiment. In local printing, the host computer 101 can acquire the status information about the printing apparatus 102 directly from the printing apparatus 102 without the cloud. In conventional local printing, in a case where the print data generation software 202 detects an error state of the printing apparatus 102, a toast notification 302 is displayed on a screen. Then, in a case where the toast notification 302 is pressed by a user, the OS activates the notification unit 209 of the extension application 204, and the notification unit 209 displays a status notification screen 800. Details of the status notification screen 800 will be described below with reference to FIG. 8. A case where the status notification application 211 provides a notification of the status information about the printing apparatus 102 in local printing according to the present exemplary embodiment will be described below.

Figure 4:
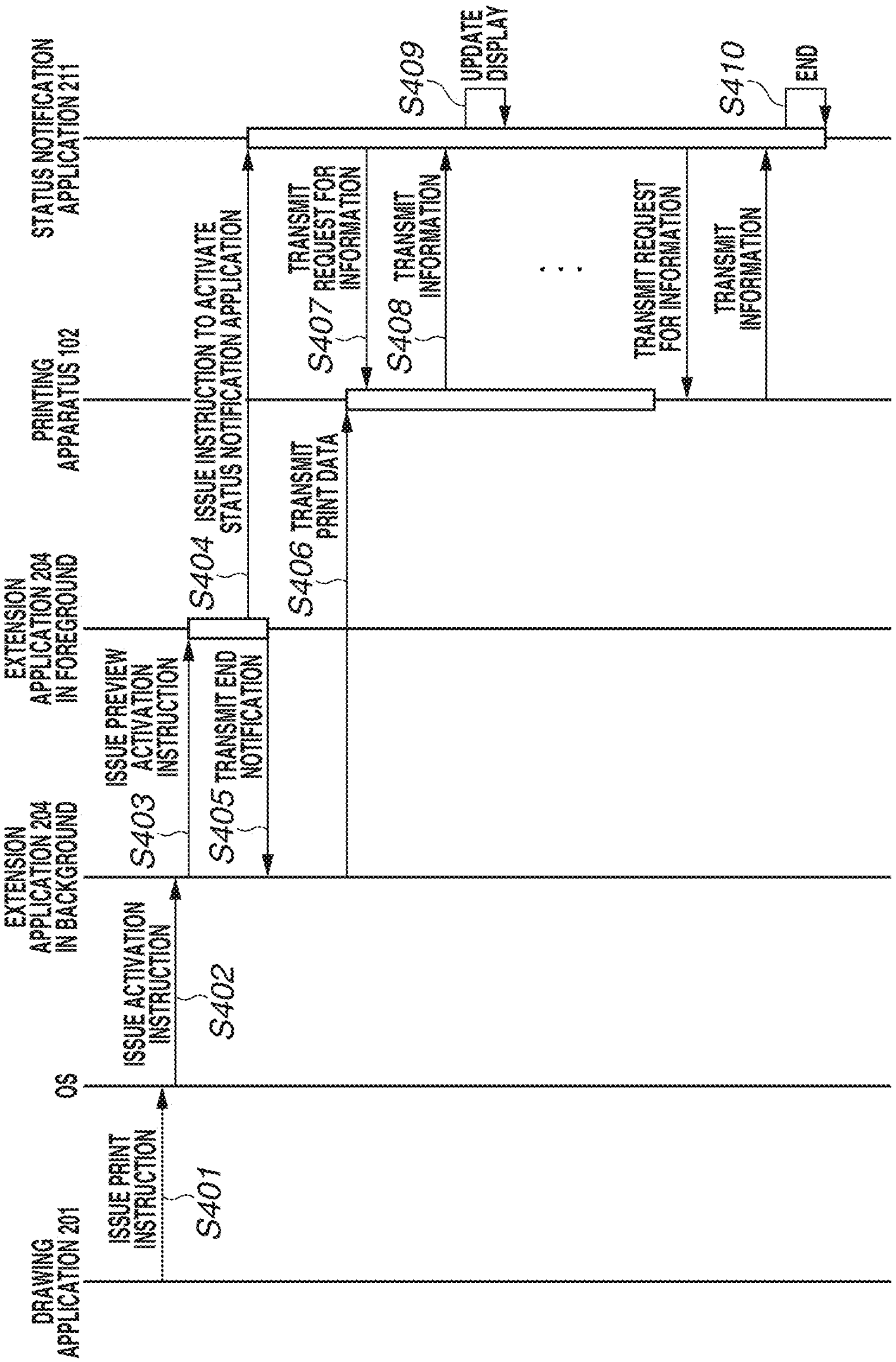
FIG. 4 is a sequence diagram illustrating the system.

FIG. 4 is a sequence diagram illustrating the system. While an apparatus, an application, or the OS is sometimes described as a performer of processing below, in reality, a corresponding function is realized by a processor such as a CPU in an apparatus by executing a corresponding program. The entire processing needs not necessarily be performed sequentially on a single process, and there may be a case where the processing is transferred to the OS and is then called from the OS. The flow of processing is mainly to illustrate major processing clearly for convenience.

The sequence in FIG. 4 is started in a case where an operation for issuing a print instruction is performed by a user. The operation for issuing a print instruction is, for example, an operation of pressing a print button (not illustrated) on a print setting screen opened by the extension application 204 on a screen of the drawing application 201. Hereinafter, the print data editing unit 208 operating in a state where the print data editing unit 208 is displayed on the host computer 101 will be described as the print data editing unit 208 operating in a foreground process. Further, the print data editing unit 208 operating in a state where the print data editing unit 208 is not displayed on the host computer 101 will be described as the print data editing unit 208 operating in a background process.

In step S401, the drawing application 201 issues a print instruction to the OS based on the user operation. In the sequence, the processing of the print data generation software 202 is omitted.

In step S402, the OS activates the print data editing unit 208 of the extension application 204 in the background process.

In step S403, the print data editing unit 208 is activated in the background process.

The print data editing unit 208 activated in the background process activates the print data editing unit 208 in the foreground process and issues a UI screen activation instruction to the print data editing unit 208 operating in the foreground process. When a UI screen activation instruction is issued, the print data editing unit 208 operating in the foreground process is activated and activates the UI screen. For example, the print data editing unit 208 operating in the foreground process displays a print preview. After displaying the print preview, the print data editing unit 208 operating in the foreground process remains in a stand-by state until the display of the print preview is ended. The print preview is ended in a case where the user issues an instruction to continue the printing or an instruction to cancel the printing after checking the print preview.

In step S404, the print data editing unit 208 operating in the foreground process activates the status notification application 211.

In step S405, the print data editing unit 208 operating in the background process receives a print preview end notification and ends the stand-by state.

In step S406, the print data editing unit 208 transmits print data to the printing apparatus 102.

In step S407, the status notification application 211 transmits a status information acquisition request to the printing apparatus 102.

In step S408, the printing apparatus 102 transmits the status information about the printing apparatus 102 as a response to the status information acquisition request.

In step S409, the status notification application 211 displays a status notification screen based on the acquired status information. The status notification application 211 repeatedly performs steps S407 to S409 until the printing apparatus 102 ends the printing processing of the target print job. Specifically, the status notification application 211 updates the status information about the printing apparatus 102 and displays the updated status information.

In step S410, the status notification application 211 determines whether the printing processing of the target print job is ended, based on the acquired status information. Then, in a case where the status notification application 211 determines that the printing processing of the target print job is ended, the repeated performance of steps S407 to S409 is ended.

Figure 5:
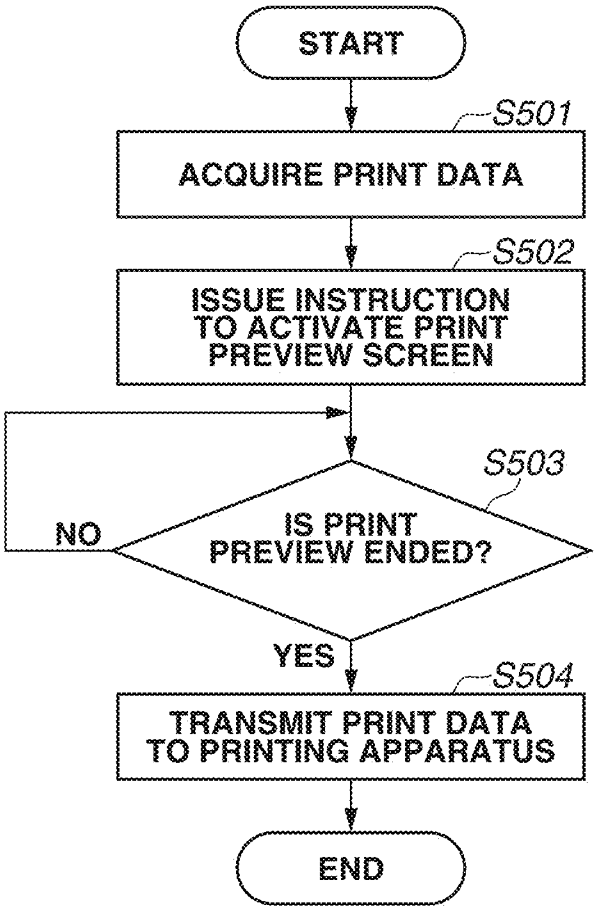
FIG. 5 is a flowchart of a print data editing unit (background).

FIG. 5 is a flowchart illustrating the background process of the print data editing unit 208. The process in the flowchart in FIG. 5 is started in a case where the print data editing unit 208 is activated by the OS. While the print data editing unit 208 is sometimes described as a performer of processing below, in reality, a corresponding function is realized by the CPU 111 by executing a corresponding program.

In step S501, the print data editing unit 208 operating in the background process acquires intermediate data or print data. The acquired print data is data generated by the print data generation software 202. In a case where a skip instruction is issued by the skip control unit 206, intermediate data generated by the OS is acquired.

In step S502 corresponding to step S403 in FIG. 4, the print data editing unit 208 operating in the background process issues a UI screen activation instruction to the print data editing unit 208 operating in the foreground process.

For example, a print preview screen activation instruction is issued. The print settings can include a print preview function setting so that the user can select whether to use the print preview function. In a case where the print preview function setting is set to not use the print preview function, in step S502, the print data editing unit 208 operating in the background process issues an instruction to activate the status notification application 211 instead of issuing a UI screen activation instruction to the print data editing unit 208 operating in the foreground process. In this case, step S503 is skipped.

In step S503, the print data editing unit 208 operating in the background process determines whether the UI screen display processing is ended. In a case where the print data editing unit 208 operating in the background process determines that the UI screen display processing is ended in step S503 (YES in step S503), the processing proceeds to step S504, whereas in a case where the print data editing unit 208 operating in the background process determines that the UI screen display processing is not ended in step S503 (NO in step S503), step S503 is repeated. Specifically, the print data editing unit 208 stops processing and waits until the activated print preview screen is ended.

In step S504 corresponding to step S406 in FIG. 4, the print data editing unit 208 operating in the background process transmits the print data to the printing apparatus 102. Consequently, the printing apparatus 102 starts printing processing based on the acquired print data. In a case where a skip instruction is issued by the skip control unit 206, the acquired print data is intermediate data generated by the OS. Thus, the print data editing unit 208 operating in the background process converts the intermediate data into print data interpretable by the printing apparatus 102 and transmits the print data. In a case where the print data editing unit 208 operating in the background process completes the transmission processing of the print data to the printing apparatus 102, the process in the flowchart is ended.

Figure 6:
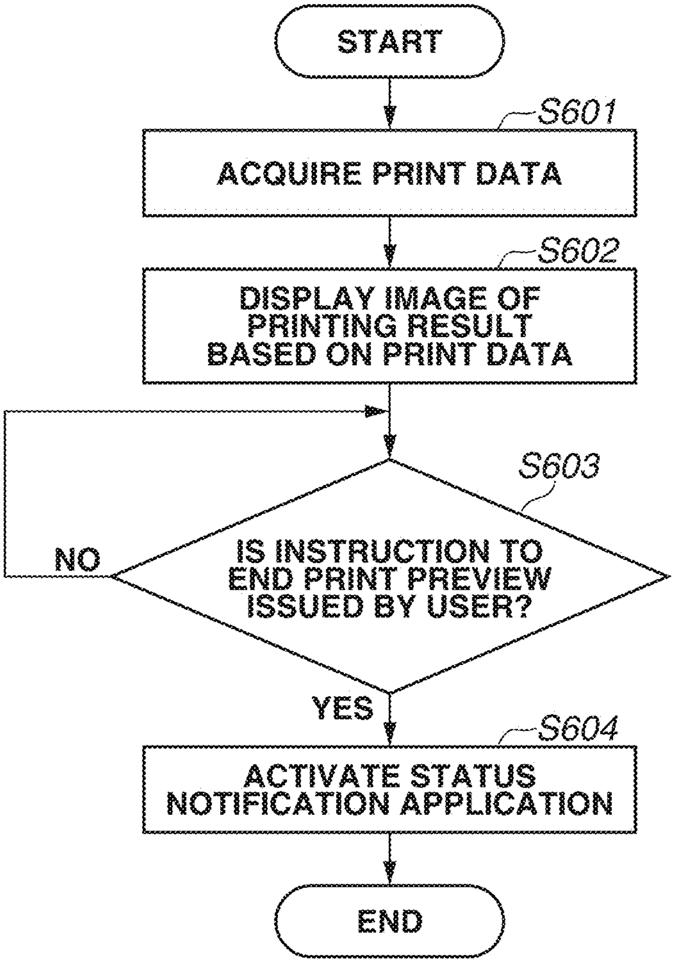
FIG. 6 is a flowchart of the print data editing unit (foreground).

FIG. 6 is a flowchart illustrating a process of the print data editing unit 208 operating in the foreground process. The process in the flowchart in FIG. 6 is started in a case where a UI activation instruction is issued by the print data editing unit 208 operating in the background process. While the print data editing unit 208 is sometimes described as a performer of processing below, in reality, a corresponding function is realized by the CPU 111 by executing a corresponding program.

In a case where the print preview function setting is set to not use the print preview function, in step S502 in FIG. 5, the print data editing unit 208 operating in the background process issues an instruction to activate the status notification application 211 instead of issuing a UI screen activation instruction to the print data editing unit 208 operating in the foreground process. Thus, steps S601 and S604 in FIG. 6 described below are to be performed and steps S602 and S603 can be skipped.

Step S601 is similar to step S501 in FIG. 5, so that redundant descriptions thereof are omitted.

In step S602, the print data editing unit 208 operating in the foreground process displays a print preview screen for previewing a printing result, based on the acquired print data. The user can determine whether to continue or cancel the printing by checking the print preview screen. In a case where the print preview function setting is set to not use the print preview function, steps S602 and S603 are skipped.

In step S603, the print data editing unit 208 operating in the foreground process determines whether a print preview end instruction is issued by the user. In a case where the print data editing unit 208 operating in the foreground process determines that a print preview end instruction is issued by the user in step S603 (YES in step S603), the processing proceeds to step S604, whereas in a case where the print data editing unit 208 operating in the foreground process determines that a print preview end instruction is not issued by the user in step S603 (NO in step S603), step S603 is repeated. Specifically, the foreground process of the print data editing unit 208 stops processing and waits until a print preview screen end instruction is issued.

In step S604, the print data editing unit 208 operating in the foreground process activates the status notification application 211, and the process in the flowchart is ended. In activating the status notification application 211, the print data editing unit 208 operating in the foreground process transmits at least one of information about a target print queue name and information about a uniform resource identifier (URI) for communicating with the printing apparatus 102, to the status notification application 211. The status notification application 211 uses the information to identify the printing apparatus 102 that is a target apparatus of which the status information is to be displayed. Further, identification information about the target print job is transmitted as an activation parameter. The identification information about the print job is used to determine whether the printing apparatus 102 is in the process of performing printing processing of the target job. Specifically, the status notification application 211 determines whether the printing processing of the target print job is being performed, by comparing the identification information about the print job being printed that is included in the status information acquired from the printing apparatus 102 with the identification information about the print job that is provided as an activation parameter. This enables the status notification application 211 to provide a notification of the status information about the target print job that has triggered the activation, to the user. Furthermore, the status notification application 211 can end the display of the status notification screen at the same time as the printing processing of the print job is ended. The process of the status notification application 211 will be described below with reference to FIG. 7. Timings of acquiring printing apparatus information, such as the information about the target print queue name, the information about the URI for communicating with the printing apparatus 102, and the identification information about the print job, can be any timings at which the extension application 204 can communicate with the printing apparatus 102.

Figure 7:
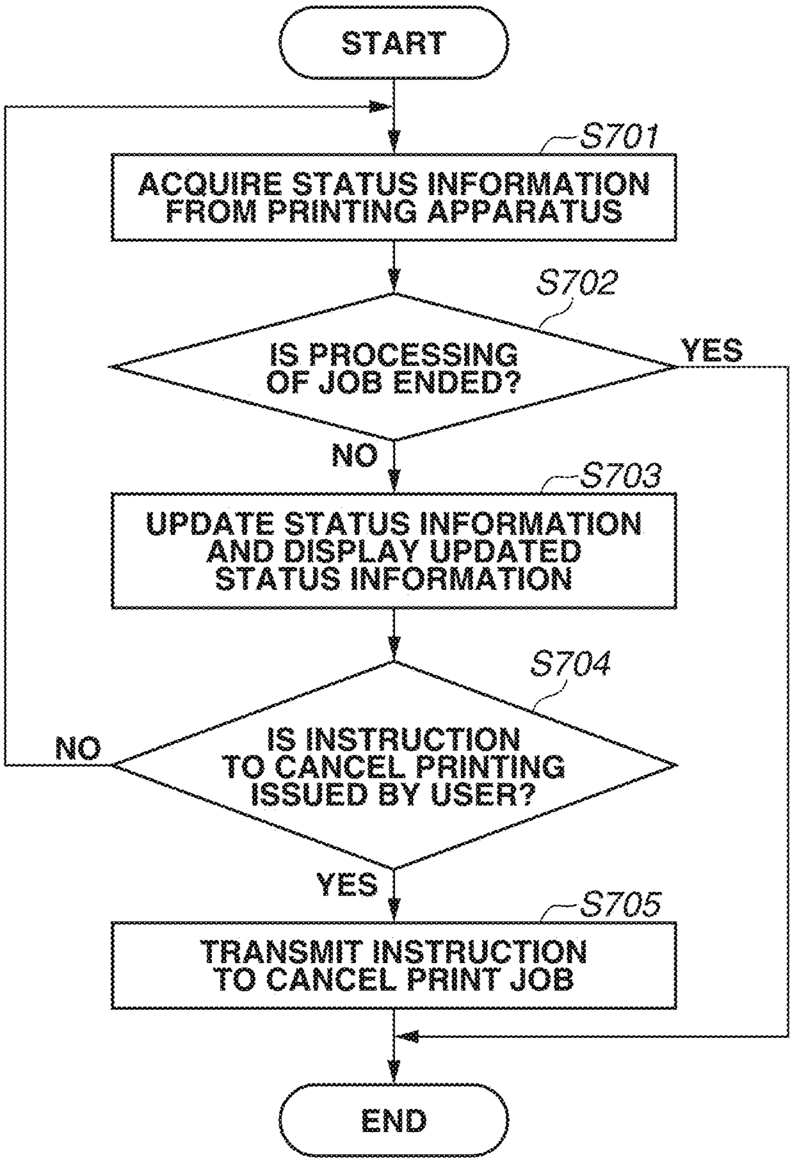
FIG. 7 is a flowchart of a status notification application.

FIG. 7 is a flowchart illustrating a process of the status notification application 211. The process in the flowchart in FIG. 7 is started in a case where the status notification application 211 is activated by the print data editing unit 208 operating in the foreground process. While the status notification application 211 is sometimes described as a performer of processing below, in reality, a corresponding function is realized by the CPU 111 by executing a corresponding program.

In step S701, the status notification application 211 acquires the status information from the printing apparatus 102. The status information includes, but is not limited to, identification (ID) information for identifying the print job being processed, information about a processing state of the print job, information indicating an error having occurred in the printing apparatus 102, and ink level information.

In step S702, the status notification application 211 determines whether the printing processing of the target print job is ended. Whether the target print job is being processed can be determined by comparing the identification information about the print job that is provided as an activation parameter with the status information acquired from the printing apparatus 102. In a case where the status notification application 211 determines that the printing processing of the target print job is ended in step S702 (YES in step S702), the process in the flowchart is ended, whereas in a case where the status notification application 211 determines that the printing processing of the target print job is not ended in step S702 (NO in step S702), the processing proceeds to step S703.

Figure 8:
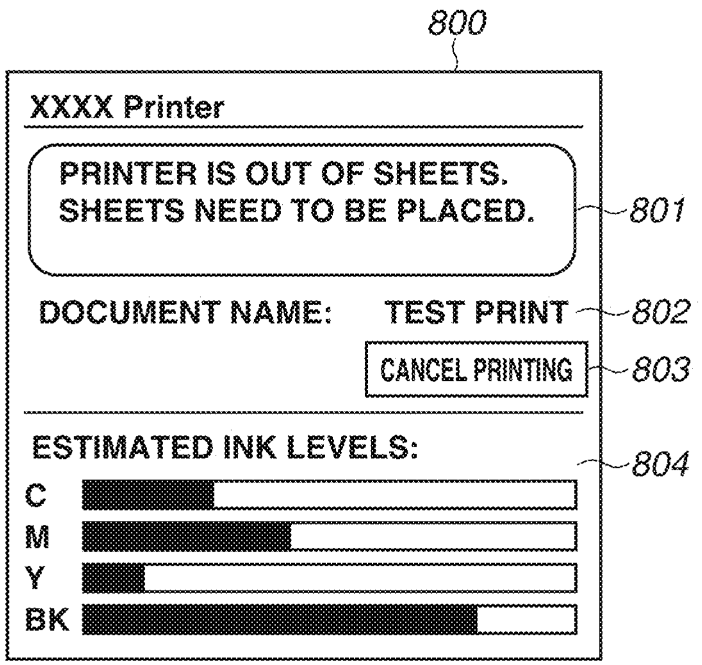
FIG. 8 illustrates an example of a notification screen.

In step S703, the status notification application 211 displays status notification information based on the status information acquired in step S701. In a case where the process in the flowchart is repeatedly performed, the status notification application 211 updates previously-acquired status information and displays the updated status information. FIG. 8 is a diagram illustrating an example of a status notification screen displayed by the notification unit 209. The status notification screen 800 displayed by the notification unit 209 is a screen that notifies the user of a state of the printing apparatus 102 and a state of the print job based on the status information acquired from the printing apparatus 102. A display region 801 is a region where a message indicating the state of the printing apparatus 102 is displayed based on the status information acquired from the printing apparatus 102. For example, in a case where an out-of-sheet error occurs in the printing apparatus 102, a message indicating the out-of-sheet state is displayed as illustrated in FIG. 8. A display region 802 is a region where information about a print job that has caused the status notification screen 800 to be displayed is displayed. The example in FIG. 8 indicates that a job with the name "Test Print" is a target print job. A control item 803 is a printing cancel button, and in a case where the control item 803 is pressed, the printing of the print job specified in the display region 802 is cancelled. A display region 804 is a region where information about remaining amounts of ink in the printing apparatus 102 is displayed. Errors in the printing apparatus 102 besides the out-of-sheet error include a low ink level error indicating that an ink level is low, an out-of-ink error indicating that an ink is used up, and a paper jam error indicating a paper jam. In a case where at least one of the errors occurs, a corresponding error message is displayed in the display region 801. Further, information that is displayed on the status notification screen 800 is not limited to those described above. Information about the processing state of the print job among the acquired status information can be displayed.

In step S704, the status notification application 211 determines whether an operation for cancelling the printing processing of the print job is performed on the status notification screen 800 by the user. In a case where the status notification application 211 determines that an operation for cancelling the printing processing of the print job is performed by the user in step S704 (YES in step S704), the processing proceeds to step S705, whereas in a case where the status notification application 211 determines that an operation for cancelling the printing processing of the print job is not performed by the user in step S704 (NO in step S704), the processing returns to step S701. Specifically, in a case where an operation for cancelling the printing processing of the print job is not performed by the user, steps S701 to S704 are repeated until the processing of the print job is ended (YES in step S702).

In step S705, the status notification application 211 transmits, to the printing apparatus 102, information indicating that the operation for cancelling the printing processing of the print job is performed, and the process in the flowchart is ended. Consequently, the printing apparatus 102 cancels the printing processing of the designated print job.

As described above, in a case where the extension application 204 operates in association with the print data generation software 202 for local printing, the status notification application 211 capable of providing a status notification even in a case where the printing apparatus 102 is not in an error state is activated based on a print instruction from the user, and the status notification screen is provided. This makes it possible to display a status notification even in a case where the printing apparatus 102 is not in an error state. Further, the possibility of not displaying a status notification in a case where a user fails to notice a toast notification and the toast notification is not pressed is reduced. Furthermore, the status information about the printing apparatus 102 after the print data is transmitted to the printing apparatus 102 and printing is started can also be displayed without a toast notification.

While the status notification application 211 is described as an application different from the extension application 204 according to the above-described exemplary embodiment, the extension application 204 can be activated as another instance. In this case, the extension application 204 activated as another instance performs the operations of the status notification application 211 described above. The status notification application 211 and the extension application 204 activated as another instance can display different notification screens or the same notification screen as the status notification screen 800 illustrated in FIG. 8. Further, the UI screen of the notification unit 209 displayed via a toast notification as described above can be a different notification screen from or the same notification screen as the notification screen displayed by the status notification application 211 or by the extension application 204 activated as another instance.

While the print data editing unit 208 activates the status notification application 211 in the foreground process according to the above-described exemplary embodiment, the status notification application 211 can be activated from the background process in an environment where another application can be activated from the background process. Specifically, in step S502 in FIG. 5, the print data editing unit 208 operating in the background process can activate the status notification application 211 instead of issuing a UI screen activation instruction to the print data editing unit 208 operating in the foreground process. In this case, the process in the flowchart in FIG. 6 can be skipped.

A case where the extension application 204 operates in association with the print data generation software 202 for local printing according to the first exemplary embodiment is described above. A case where the extension application 204 operates in association with the print data generation software 202 for cloud printing according to a second exemplary embodiment will be described below. A cloud print service 301 in FIG. 3 is a service that operates between a host device and the printing apparatus 102 and provides a cloud printing function. In performing cloud printing, the host device such as the host computer 101 transmits a print job to the cloud print service 301. Then, the printing apparatus 102 acquires the print job from the cloud print service 301 and performs printing. Further, a processing status of the print job and state information about the printing apparatus 102 are transmitted from the printing apparatus 102 to the cloud print service 301 and then transmitted to the host computer 101 via the cloud print service 301. Specifically, according to the conventional techniques, the print data generation software 202 for cloud printing acquires the status information from the cloud print service 301, and in a case where the print data generation software 202 detects the printing apparatus 102 in an error state, the OS displays the toast notification 302. Then, in a case where the toast notification 302 is pressed by the user, the OS activates the notification unit 209 of the extension application 204, and the notification unit 209 displays the status notification screen 800.

A case in cloud printing according to the present exemplary embodiment will be described below. In the cloud printing according to the present exemplary embodiment, the extension application 204 acquires the status information about the printing apparatus 102 from the cloud print service 301 and transmits the acquired status information to the status notification application 211. Then, the status notification application 211 provides a notification of the status information about the printing apparatus 102. Redundant descriptions of processing similar to the processing according to the first exemplary embodiment are omitted in the present exemplary embodiment.

Figure 9:
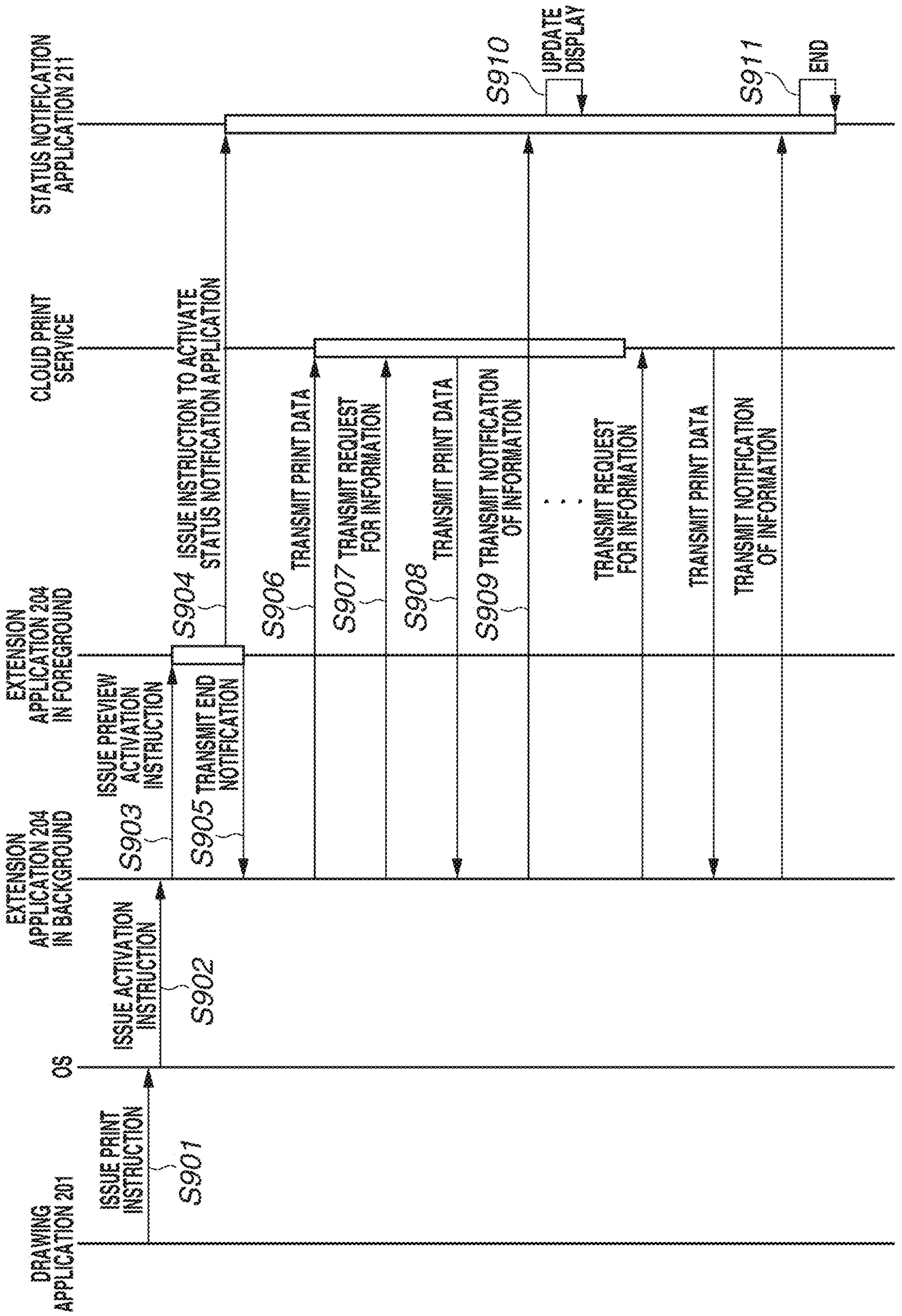
FIG. 9 is a sequence diagram illustrating the system.

FIG. 9 is a sequence diagram illustrating the system. While an apparatus, an application, or the OS is sometimes described as a performer of processing below, in reality, a corresponding function is realized by a processor such as a CPU in an apparatus by executing a corresponding program. The entire processing needs not necessarily be performed sequentially on a single process, and there may be a case where the processing is transferred to the OS and is then called from the OS. The flow of processing is mainly to illustrate major processing clearly for convenience.

The sequence in FIG. 9 is started in a case where an operation for issuing a print instruction is performed by a user. The operation for issuing a print instruction is, for example, an operation of pressing the print button (not illustrated) on the print setting screen opened by the extension application 204 on a screen of the drawing application 201.

Steps S901 to S905 are similar to steps S401 to S405, so that redundant descriptions thereof are omitted.

In step S906, the print data editing unit 208 operating in the background process transmits the print data to the cloud print service 301.

In step S907, the print data editing unit 208 operating in the background process transmits a status information acquisition request to the cloud print service 301.

In step S908, the cloud print service 301 transmits the status information to the print data editing unit 208 operating in the background process as a response to the status information acquisition request.

In step S909, the print data editing unit 208 operating in the background process transmits the acquired status information to the status notification application 211.

Steps S910 and S911 are similar to steps S409 and S410 in FIG. 4, so that redundant descriptions thereof are omitted.

As described above, the provision of a status notification using the status notification application 211 can be performed even in a case where the extension application 204 operates in association with the print data generation software 202 for cloud printing.

Figure 10:
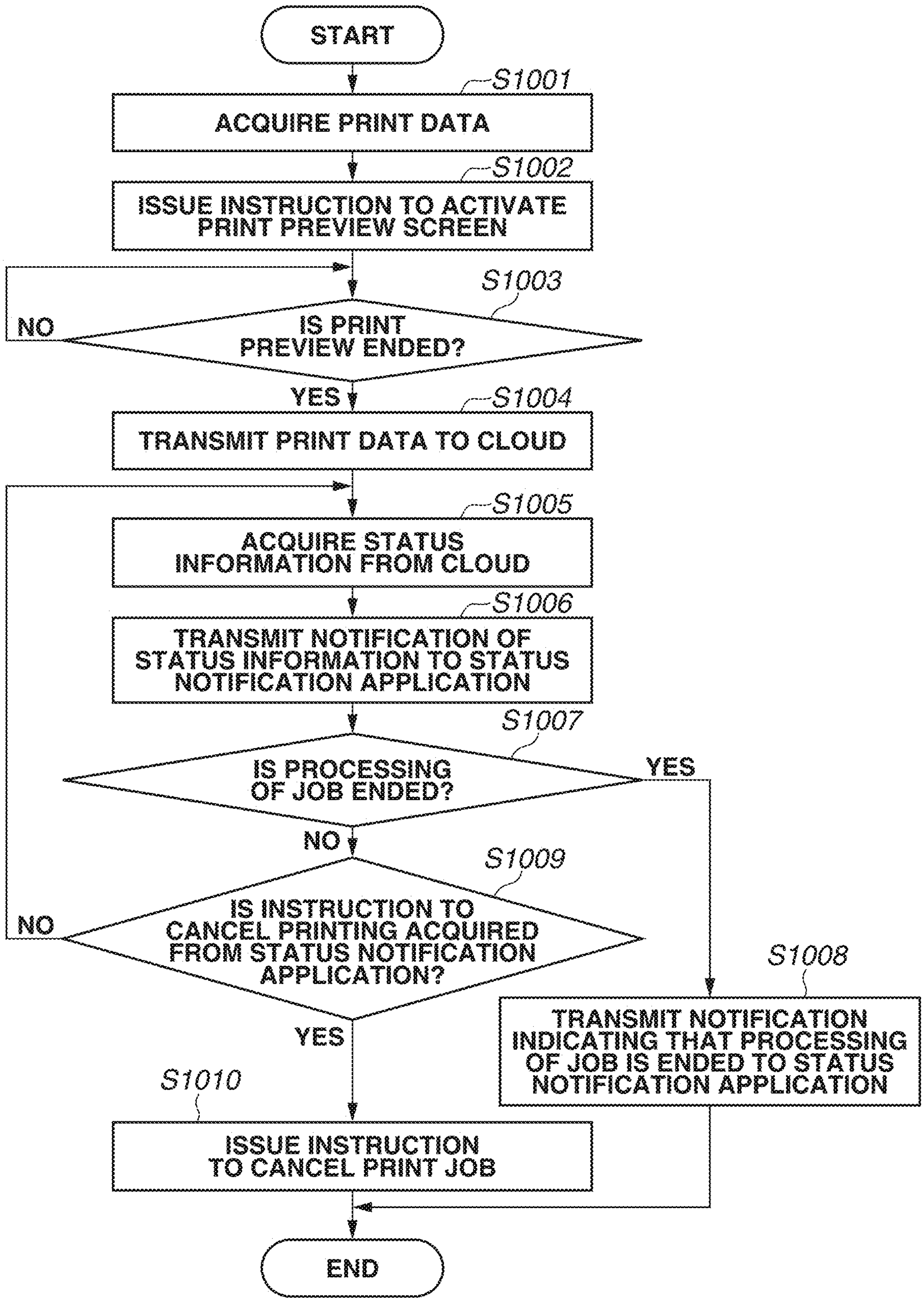
FIG. 10 is a flowchart of a print data editing unit (background).

FIG. 10 is a flowchart illustrating a process of the print data editing unit 208 operating in the background process. The process in the flowchart in FIG. 10 is started in a case where the print data editing unit 208 is activated from the OS. While the print data editing unit 208 is sometimes described as a performer of processing below, in reality, a corresponding function is realized by the CPU 111 by executing a corresponding program.

Steps S1001 to S1004 are similar to steps S501 to S504, so that redundant descriptions thereof are omitted. In step S1004, the print data editing unit 208 operating in the background process transmits the print data to the cloud print service 301.

In step S1005, the print data editing unit 208 operating in the background process acquires the status information from the cloud print service 301.

In step S1006 corresponding to step S909, the print data editing unit 208 operating in the background process transmits the status information acquired in step S1005 to the status notification application 211. A communication method in transmitting the status information can be, but is not limited to, inter-process communication. The status notification application 211 provides a status notification based on the transmitted status information.

In step S1007, the print data editing unit 208 operating in the background process determines whether the printing apparatus 102 has ended the printing processing of the target print job, based on the status information acquired in step S1005. In a case where the print data editing unit 208 determines that the printing apparatus 102 has ended the printing processing of the target print job in step S1007 (YES in step S1007), the processing proceeds to step S1008, whereas in a case where the print data editing unit 208 determines that the printing apparatus 102 has not ended the printing processing of the target print job in step S1007 (NO in step S1007), the processing proceeds to step S1009.

In step S1008, the print data editing unit 208 operating in the background process transmits information indicating that the printing processing of the target print job is ended to the status notification application 211, and the process in the flowchart is ended.

In step S1009, the print data editing unit 208 operating in the background process determines whether information indicating that an operation for cancelling the printing processing of the print job is performed is acquired from the status notification application 211. In a case where the print data editing unit 208 determines that the information indicating that an operation for cancelling the printing processing of the print job is performed is acquired from the status notification application 211 in step S1009 (YES in step S1009), the processing proceeds to step S1010, whereas in a case where the print data editing unit 208 determines that the information is not acquired in step S1009 (NO in step S1009), the processing returns to step S1005.

In step S1010, the print data editing unit 208 operating in the background process issues an instruction for cancelling the printing processing of the target print job. The instruction for cancelling the printing processing of the target print job is issued to the printing apparatus 102 via the OS by issuing an instruction for cancelling the printing processing to the OS from the print data editing unit 208. Further, in a case where the print data editing unit 208 operating in the background process can communicate with the printing apparatus 102, the print data editing unit 208 operating in the background process can issue an instruction for cancelling the printing processing to the printing apparatus 102. The print data editing unit 208 can transmit information about an instruction for cancelling the printing processing to the cloud print service 301, and an instruction to cancel the printing processing can be issued to the printing apparatus 102 via the cloud print service 301.

Figure 11:
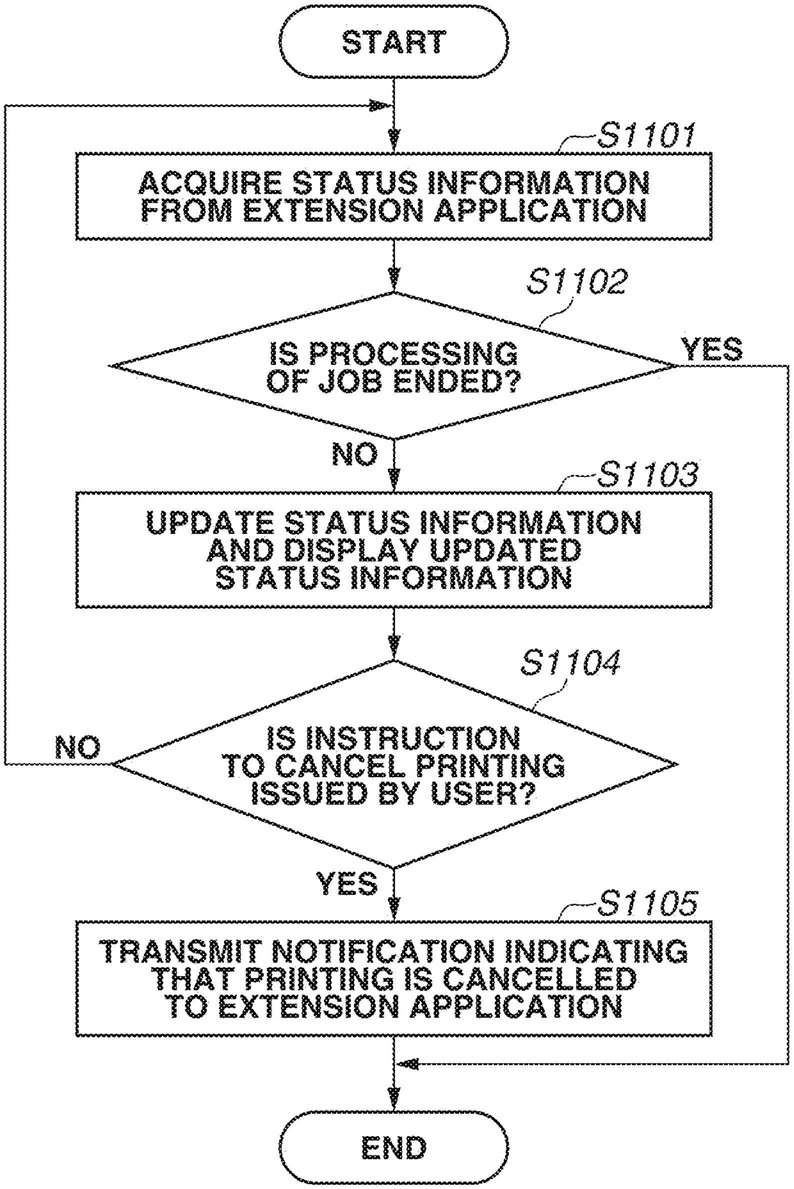
FIG. 11 is a flowchart of a status notification application.

FIG. 11 is a flowchart illustrating a process of the status notification application 211. The process in the flowchart in FIG. 11 is started in a case where the status notification application 211 is activated by the print data editing unit 208 operating in the foreground process. While the status notification application 211 is sometimes described as a performer of processing below, in reality, a corresponding function is realized by the CPU 111 by executing a corresponding program.

In step S1101, the status notification application 211 acquires the status information from the print data editing unit 208. The status information includes, but is not limited to, ID information for identifying the print job being processed, information about a processing state of the print job, information indicating an error having occurred in the printing apparatus 102, and ink level information.

In step S1102, the status notification application 211 determines whether the printing processing of the target print job is ended. Whether the target print job is being processed can be determined by comparing the identification information about the print job that is provided as an activation parameter with the status information acquired from the printing apparatus 102. In a case where the status notification application 211 determines that the printing processing of the target print job is ended in step S1102 (YES in step S1102), the process in the flowchart is ended, whereas in a case where the status notification application 211 determines that the printing processing of the target print job is not ended in step S1102 (NO in step S1102), the processing proceeds to step S1103.

In step S1103, the status notification application 211 displays status notification information based on the status information acquired in step S1101. In a case where the process in the flowchart is repeatedly performed, the status notification application 211 updates previously-acquired status information and displays the updated status information. The status notification screen displayed by the notification unit 209 is similar to the status notification screen in FIG. 8.

In step S1104, the status notification application 211 determines whether an operation for cancelling the printing apparatus is performed by the user via the status notification screen. In a case where the status notification application 211 determines that an operation for cancelling the printing apparatus is performed by the user via the status notification screen in step S1104 (YES in step S1104), the processing proceeds to step S1105, whereas in a case where the status notification application 211 determines that an operation for cancelling the printing apparatus is not performed by the user via the status notification screen in step S1104 (NO in step S1104), the processing returns to step S1101.

In step S1105, the status notification application 211 transmits information indicating that the operation for cancelling the printing processing of the print job is performed to the print data editing unit 208, and the process in the flowchart is ended. Thus, in step S1010, the print data editing unit 208 issues an instruction for cancelling the printing processing of the designated print job.

As described above, in a case where the extension application 204 operates in association with the print data generation software 202 for cloud printing, the status notification application 211 capable of providing a status notification even in a case where the printing apparatus 102 is not in an error state is activated based on a print instruction from the user, and the status notification screen is provided. This makes it possible to display a status notification even in a case where the printing apparatus 102 is not in an error state. Further, the possibility of not displaying a status notification in a case where a user fails to notice a toast notification and the toast notification is not pressed is reduced. Furthermore, the status information about the printing apparatus 102 after the print data is transmitted to the printing apparatus 102 and printing is started can also be displayed without a toast notification. Furthermore, use of the configuration makes it possible to provide the status notification screen using the status notification application 211 even in a case where a server is used in a case where a printer is shared and used.

In the configuration according to the present exemplary embodiment, the extension application 204 acquires the status information about the printing apparatus 102 from the cloud print service 301 and transmits the status information about the printing apparatus 102 to the status notification application 211.

Alternatively, in a case where the status notification application 211 can acquire the status information about the printing apparatus 102 from the cloud print service 301, the status notification application 211 can acquire the status information about the printing apparatus 102 from the cloud print service 301.

In the configurations according to the first and second exemplary embodiments, the print data editing unit 208 activates the status notification application 211 each time print data of a target print job is received. A method for selecting whether to activate the status notification application 211 based on a setting set by a user or an administrator according to a third exemplary embodiment will be described below. Redundant descriptions of processing similar to the processing according to the first or second exemplary embodiment are omitted in the present exemplary embodiment.

Figure 12:
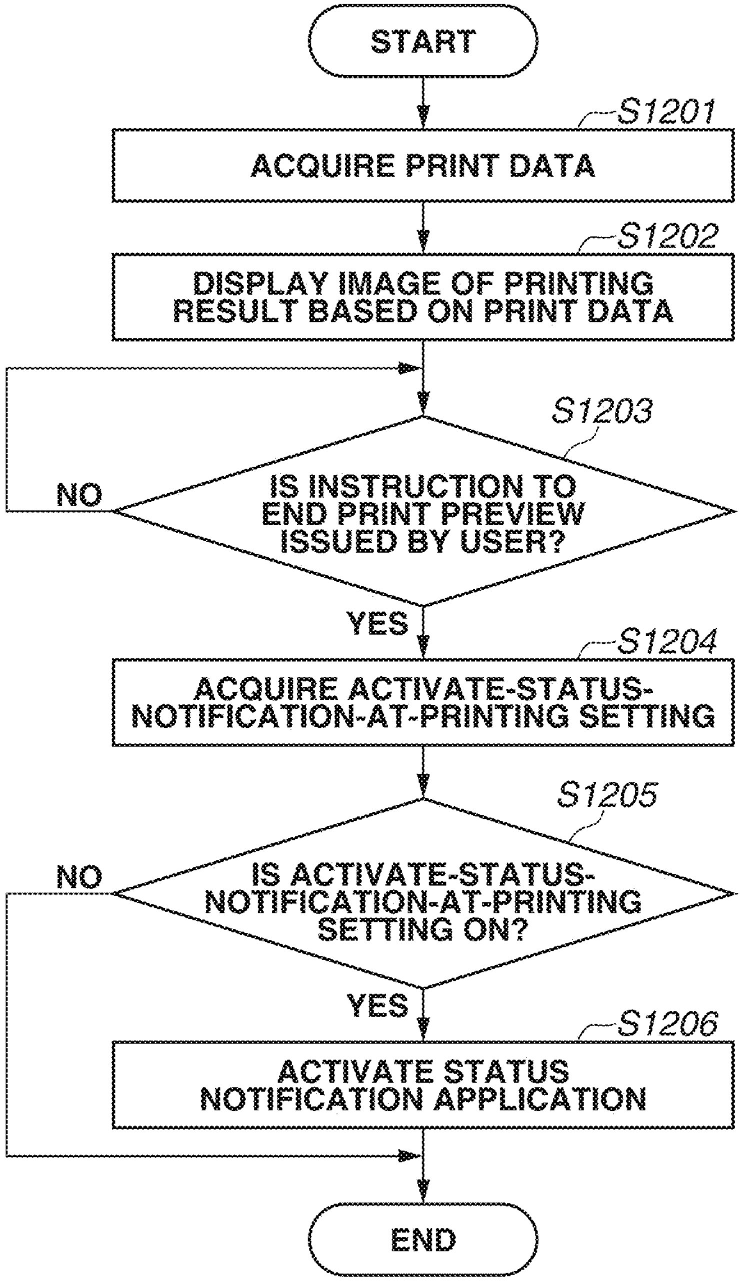
FIG. 12 is a flowchart of the print data editing unit (foreground).

FIG. 12 is a flowchart illustrating a process of the print data editing unit 208 operating in the foreground. The process in the flowchart in FIG. 12 is started in a case where the print data editing unit 208 operating in the background issues a UI activation instruction. While the print data editing unit 208 is sometimes described as a performer of processing below, in reality, a corresponding function is realized by the CPU 111 by executing a corresponding program.

Steps S1201 to S1203 are similar to steps S601 to S603 in FIG. 6, so that redundant descriptions thereof are omitted.

In step S1204, the print data editing unit 208 operating in the foreground acquires an activate-status-notification-at-printing setting. The activate-status-notification-at-printing setting is a setting via which a user can select whether to provide a status information notification in a case where an operation for starting the printing processing of the print job is performed. The activate-status-notification-at-printing setting is set on the print setting screen displayed by the print setting screen extension unit 205 of the extension application 204.

The activate-status-notification-at-printing setting is stored as a print setting in the PT storing print settings or in the shared information 210. For example, the activate-status-notification-at-printing setting is stored as an on/off setting to display or not display the status notification screen at printing. An area to display the activate-status-notification-at-printing setting, a method for storing the set information, and a storage location of the set information are not limited to those described above.

In step S1205, the print data editing unit 208 operating in the foreground determines whether the activate-status-notification-at-printing setting is set to provide a status information notification in a case where an operation for starting the printing processing of a print job is performed. Specifically, the print data editing unit 208 determines whether the activate-status-notification-at-printing setting is on or off. In a case where the print data editing unit 208 determines that the activate-status-notification-at-printing setting is set to provide a status information notification in step S1205 (YES in step S1205), the processing proceeds to step S1206, whereas in a case where the print data editing unit 208 determines that the activate-status-notification-at-printing setting is set not to provide a status information notification in step S1204 (NO in step S1204), the process in the flowchart is ended.

Step S1206 is similar to step S604, so that redundant descriptions thereof are omitted.

The foregoing process makes it possible to select whether to activate the status notification application 211 in a case where an operation for starting the printing processing of a print job is started, based on the activate-status-notification-at-printing setting.

As described above, the notification unit 209 can provide a toast notification in a case where an error occurs in the printing apparatus 102. Thus, whether to provide a toast notification can be selected based on whether the activate-status-notification-at-printing setting is on or off. Specifically, the notification unit 209 acquires the activate-status-notification-at-printing setting and determines whether the activate-status-notification-at-printing setting is on or off. In a case where the activate-status-notification-at-printing setting is on, the notification unit 209 determines that the status notification application 211 is activated, and the notification unit 209 needs not provide a toast notification even in a case where an error occurs. Further, in a case where the activate-status-notification-at-printing setting is off, the notification unit 209 determines that the status notification application 211 is not activated, and the notification unit 209 can provide a toast notification in a case where an error occurs. This implements a configuration in which a status notification is provided not each time the printing processing of a print job is performed, and a toast notification is provided in a case where an error occurs in the printing apparatus 102. Furthermore, the inconvenience caused by a display of both a status notification by the status notification application 211 and a toast notification by the notification unit 209 is reduced. Alternatively, both a status notification by the status notification application 211 and a toast notification by the notification unit 209 can be displayed at an error occurrence in the printing apparatus 102 even in a case where the activate-status-notification-at-printing setting is on. This ensures that an error notification is provided to the user in a case where an error occurs in the printing apparatus 102. Further, whether the status notification application 211 is activated is determined in a case where the activate-status-notification-at-printing setting is on, and in a case where the status notification application 211 is determined as being activated, the notification unit 209 needs not provide a toast notification. Further, in a case where the activate-status-notification-at-printing setting is on and the status notification application 211 is determined as being not activated, the notification unit 209 can provide a toast notification. This ensures that a notification of an error occurrence in the printing apparatus 102 is provided to the user.

Other Exemplary Embodiments

In the above-described method in local printing according to the first exemplary embodiment, the status notification application 211 communicates directly with the printing apparatus 102 to acquire the status information, and displays the status notification screen 800. Further, in the above-described method in cloud printing according to the second exemplary embodiment, the print data editing unit 208 acquires the status information and transmits the acquired status information to the status notification application 211 so that the status notification application 211 displays the status notification screen 800 based on the acquired status information. According to another exemplary embodiment, with which one of the print data generation software 202 for local printing and the print data generation software 202 for cloud printing the extension application 204 is associated is determined, and the processing according to the first exemplary embodiment or the processing according to the second exemplary embodiment can be selected based on the determination result. This determination can be performed by the print data editing unit 208 of the extension application 204, or the print setting screen extension unit 205 can perform the determination and store a result of the determination as a print setting.

The above-described exemplary embodiments can be realized also by performing the following process. Specifically, software (program) for realizing functions of the above-described exemplary embodiments is supplied to a system or an apparatus via a network or various storage media, and a computer (a CPU or a micro-processing unit (MPU)) of the system or the apparatus reads the program and executes the read program. Further, the program can be executed by a single computer or by a plurality of computers in cooperation with each other. Further, not the entire processing described above needs to be realized by software, and part of the processing or the entire processing can be realized by hardware such as an application-specific integrated circuit (ASIC). Further, the processing performed by the CPU needs not be performed entirely by a single CPU and can be performed by a plurality of CPUs in cooperation with each other as appropriate.

Further, the functions of the above-described exemplary embodiments are realized not only by a computer by executing read program codes. Cases where an OS running on the computer performs part of actual processing or the entire actual processing based on instructions of the program codes and the functions of the above-described exemplary embodiments are realized by the processing are also included.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A non-transitory computer-readable storage medium storing an application program which supports an Internet Printing Protocol (IPP) driver which outputs print data, the application program including instructions, which when executed by one or more processors of an information processing apparatus, cause the information processing apparatus to:

display, based on the information processing apparatus receiving status information regarding printing of the print data after the information processing apparatus transmits the print data to a printing apparatus, a reception part for receiving a cancel instruction for canceling the printing of the print data; and receive the cancel instruction by the reception part.

2. The non-transitory computer-readable storage medium according to claim 1, wherein the instructions, when executed by the one or more processors, further cause the information processing apparatus to:

display a status of the printing apparatus based on the status information.

3. The non-transitory computer-readable storage medium according to claim 1, wherein the status is an error status.

4. The non-transitory computer-readable storage medium according to claim 1, wherein the instructions, when executed by the one or more processors, further cause the information processing apparatus to:

display a job name of a job for performing printing based on the print data.

5. The non-transitory computer-readable storage medium according to claim 1, wherein the instructions, when executed by the one or more processors, further cause the information processing apparatus to:

display a remaining amount of a consumable item of the printing apparatus.

6. The non-transitory computer-readable storage medium according to claim 1, wherein the instructions, when executed by the one or more processors, further cause the information processing apparatus to:

transmit a request for the status information to the printing apparatus, and wherein the status information is transmitted by the printing apparatus based on the request.

7. The non-transitory computer-readable storage medium according to claim 1, wherein the instructions, when executed by the one or more processors, further cause the information processing apparatus to:

transmit, based on the received cancel instruction, information for canceling the printing of the print data.

8. The non-transitory computer-readable storage medium according to claim 1, wherein the instructions, when executed by the one or more processors, further cause the information processing apparatus to:

display a preview of the print data.

9. The non-transitory computer-readable storage medium according to claim 1, wherein the IPP driver is able to cause the information processing apparatus to transmit the print data to a plurality of printing apparatuses provided by a plurality of vendors.

10. A control method for controlling an information processing apparatus by executing an application program which supports an Internet Printing Protocol (IPP) driver which outputs print data, the control method comprising:

displaying, based on the information processing apparatus receiving status information regarding printing of the print data after the information processing apparatus transmits the print data to a printing apparatus, a reception part for receiving a cancel instruction for canceling the printing of the print data; and receiving the cancel instruction by the reception part.

11. An information processing apparatus comprising:

one or more processors; and at least one memory storing an application program which supports an Internet Printing Protocol (IPP) driver which outputs print data, the application program including instructions, which when executed by the one or more processors, cause the information processing apparatus to:

display, based on the information processing apparatus receiving status information regarding printing of the print data after the information processing apparatus transmits the print data to a printing apparatus, a reception part for receiving a cancel instruction for canceling the printing of the print data; and receive the cancel instruction by the reception part.

* * * * *